United States Patent
Regensburger et al.

(10) Patent No.: US 11,652,974 B2
(45) Date of Patent: May 16, 2023

(54) STEREOSCOPIC IMAGING DEVICE AND METHOD FOR IMAGE PROCESSING

(71) Applicant: Carl Zeiss Meditec, Jena (DE)

(72) Inventors: Alois Regensburger, Poxdorf (DE); Susanne Kohlhammer, Blaustein (DE); Jonathan Essig, Neresheim (DE)

(73) Assignee: Carl Zeiss Meditec AG, Jena (DE)

(*) Notice: Subject to any disclaimer, the term of this patent is extended or adjusted under 35 U.S.C. 154(b) by 1 day.

(21) Appl. No.: 16/925,264

(22) Filed: Jul. 9, 2020

(65) Prior Publication Data

US 2021/0014470 A1    Jan. 14, 2021

(30) Foreign Application Priority Data

Jul. 9, 2019 (DE) ................... 10 2019 118 510.6

(51) Int. Cl.
*H04N 13/15* (2018.01)
*H04N 13/239* (2018.01)
(Continued)

(52) U.S. Cl.
CPC ......... *H04N 13/239* (2018.05); *H04N 13/128* (2018.05); *H04N 13/15* (2018.05); *H04N 13/254* (2018.05)

(58) Field of Classification Search
CPC .. H04N 13/128; H04N 13/239; H04N 13/106; H04N 13/133; H04N 13/15; H04N 13/254; H04N 13/271; H04N 13/296; H04N 2013/0081; H04N 13/117; H04N 13/156; H04N 13/204; H04N 13/257; H04N 13/167; H04N 13/218; H04N 13/25
(Continued)

(56) References Cited

U.S. PATENT DOCUMENTS 7,751,120 B2   7/2010 Zimmer et al.
9,704,250 B1 * 7/2017 Shah .................. G06T 7/55
(Continued)

FOREIGN PATENT DOCUMENTS

DE   102006036300 B4   11/2007
DE   202013011877 U1   10/2014
(Continued)

OTHER PUBLICATIONS

Office Action issued in German Patent Application No. DE 10 2019 118 510.6 (from which this application claims priority), dated Apr. 30, 2020 and English language machine translation thereof.

*Primary Examiner* — Masum Billah
(74) *Attorney, Agent, or Firm* — Ewers IP Law PLLC; Falk Ewers

(57) ABSTRACT

A stereoscopic imaging device includes at least a first and a second image recording unit configured to record a first and a second original image of an object from different perspectives, wherein the original images differ at least with regard to one item of image information, an image display unit for imaging displayed images, an image processing unit for further processing the original images, and the image processing unit is configured to supplement at least one of the two original images with at least one item of image information from the other original image to generate a displayed image. In addition, a method for generating at least one displayed image that can be imaged on an image display unit is provided.

27 Claims, 4 Drawing Sheets

(51) Int. Cl.
*H04N 13/254* (2018.01)
*H04N 13/128* (2018.01)
(58) Field of Classification Search
USPC .......................................................... 348/47
See application file for complete search history.

(56) References Cited

U.S. PATENT DOCUMENTS

2001/0045955 A1\* 11/2001 Oka ..................... G06T 15/04
  345/582
2012/0050492 A1\* 3/2012 Moriwake ............ H04N 13/296
  348/47

FOREIGN PATENT DOCUMENTS

| EP | 1791371 A2 | 5/2007 |
| WO | 2018032457 A1 | 2/2018 |

\* cited by examiner

STEREOSCOPIC IMAGING DEVICE AND METHOD FOR IMAGE PROCESSING

CROSS REFERENCE TO RELATED APPLICATIONS

This application claims priority to German patent application DE 10 2019 118 510.6, filed Jul. 9, 2019, the entire content of which is incorporated herein by reference.

TECHNICAL FIELD

The present disclosure relates to a stereoscopic imaging device and to a method for processing images recorded by the stereoscopic imaging device to form an image that can be displayed on a display unit.

BACKGROUND

Commercially available smartphones, e.g., Apple iPhone 7S or Huawei P9, are equipped with two cameras arranged next to one another, said cameras having different properties, e.g., different sensors, focal lengths or magnifications. By computing the two camera images using known stereo matching algorithms, an image is generated, the depth of field of which can subsequently be altered.

A stereoscopic imaging and display device delivers different images to the left and right eyes of an observer, with the result that it provides for both eyes in combination a composite image that appears to be three-dimensional. The German patent Application Publication DE 10 2006 036 300 B4 describes a stereomicroscope having different stop settings in the left and right stereo channels with identical optical magnification. This results in an increased optical resolution in one optical channel and an increased depth of field in the other channel. The observer's brain combines the two generated images and generates an image having simultaneously increased resolution and increased depth of field for the observer. This combination of the images is found to be taxing for the observer since two images having different optical properties, different brightnesses and different stereo perspectives have to be processed in the brain.

SUMMARY

It is an object of the disclosure to provide a stereoscopic imaging device which avoids the disadvantages known from the related art. A further object of the disclosure is to provide an image processing method which makes it possible to deliver to an observer an image which can be viewed by the observer without additional effort.

These objects are achieved by a stereoscopic imaging device and a method for generating at least one displayed image as described herein.

A stereoscopic imaging device according to an aspect of the disclosure includes at least a first and a second image recording unit for recording a first and a second original image of an object from different perspectives, wherein the original images differ at least with regard to one item of image information. Furthermore, the stereoscopic imaging device according to an aspect of the disclosure includes an image display unit for imaging displayed images. According to an aspect of the disclosure, an image processing unit for further processing the original images recorded by the image recording units is provided. The image processing unit is configured to supplement at least one of the two original images by at least one item of image information from the other original image in order to generate a displayed image.

An item of image information is understood hereinafter to mean an optical property in an original image. In this case, an optical property may be, e.g., the brightness, the image resolution, the depth of field, the depth plane, the contrast or the color information of an individual pixel or of a pixel region of the original image.

The further explanations and clarifications substantially relate to a stereoscopic imaging device having two image recording units, also referred to as channels. It goes without saying that the disclosure is not restricted to a stereoscopic imaging device having two channels, but rather can be extended to as many channels as desired.

An original image is understood hereinafter to mean an image of the object which is captured and recorded by a channel or an image recording unit. This original image is subsequently subjected to further processing and editing.

A displayed image is understood to mean an image which was generated from an original image and which is displayed to an observer on an image display unit.

With the stereoscopic imaging device according to an aspect of the disclosure, a stereo image of the recording region is generated in a customary manner with the recording of original images, e.g., of a medical operation site, from different perspectives. Said stereo image shows a realistic three-dimensional impression of the recording region, e.g., of the medical operation scene. In this case, as in a customary stereomicroscope, the individual original images have matched properties such as, for example, depth-dependent object resolution, brightness and contrast. With the image processing unit of the stereoscopic imaging device according to an aspect of the disclosure, the individual original images are processed in such a way that each original image is supplemented with at least one item of image information of the other original image. As a result, a displayed image is generated from each original image. For the observer, these displayed images can achieve an improved visual impression, in particular with increased depth of field, for both eyes. In contrast to the related art, the data fusion according to an aspect of the disclosure from the original images is not carried out in the observer's brain, but rather by the image processing unit, with the result that excessive fatigue phenomena for an observer or a surgeon do not occur primarily even in the case where the eyes have different visual acuities.

A contribution can be made, in particular, to improving the visual impression if the original images of the first and second image recording units differ with regard to the item of image information of depth of field or with regard to the item of image information of object resolution. In this case, e.g., the first image recording unit can be configured to record original images having a higher resolution and a lower depth of field compared with the original images recorded by the second image recording unit.

An improvement of the visual impression can be achieved by the adaptation or processing of the object resolution of a displayed image generated from an original image for objects in or near the focal plane. Furthermore, an improvement of the visual impression can be achieved by the adaptation or processing of the object resolution of a displayed image generated from an original image for objects outside the depth of field range of the original image.

The at least two image recording units can be arranged in such a way that the focal planes of the at least two image recording units are identical. However, it is also possible for the focal planes of the at least two image recording units to be inclined with respect to one another and to intersect near or on the optical axis. In particular, it is possible for the focal planes of two image recording units to be spaced apart from one another maximally by the length of a full depth of field or maximally by the length of half a depth of field.

In this case, with regard to an object in or near the focal plane, the object resolution of a displayed image generated from an original image of lower resolution can be increased compared with the original image of lower resolution. However, it is also possible for the object resolution of a displayed image generated from an original image of lower resolution to correspond to the object resolution of the original image of higher resolution.

With regard to an object outside the depth of field range of the original image having lower depth of field, the object resolution of a displayed image generated from an original image of lower depth of field can be increased compared with the original image of lower depth of field. However, it is also possible for the object resolution of a displayed image generated from an original image of lower depth of field to correspond to the object resolution of the original image of higher depth of field.

Typically, in the at least two displayed images the object resolution for all objects within the depth of field range of the original image of higher depth of field is at least approximately the same. In this case, the conditions for resolution and depth of field presented above are applicable only to object regions, e.g., object areas, which are visible from the perspectives of both image recording units.

The adaptation and processing of the original images are achieved according to an aspect of the disclosure with the image processing unit by a transfer of higher-resolution image data from the higher-resolution original image towards the image data of the lower-resolution original image. In other words, the image data of the lower-resolution original image are supplemented with those of the higher-resolution original image. As a result, the resolution of the two displayed images for objects in and near the focal plane can be almost identical or even identical. At the very least, however, the resolution of the displayed image generated from an original image of lower resolution is increased. In addition, at least the depth of field of the displayed image generated from an original image of lower depth of field can be increased.

As a result, when generating the displayed images, it is possible to achieve overall a further improved visual impression that is largely free of fatigue. For this purpose, the two displayed images can be of the same size and show the same portion of the operation site.

An improvement of the visual impression can be achieved by the image processing unit being configured to carry out a matching of at least one further item of image information for the displayed images, in particular of the brightness, contrast or color information. In particular, the image processing unit can be configured to carry out a matching of the object resolution with regard to the resolution and depth of field of the original images and additionally with regard to the brightness, contrast or color information in the original images.

The improved visual impression described above can be produced even if the image recording units differ with regard to their focal plane. Moreover, expediently, one image recording unit can be a color camera and a further image recording unit can be a monochrome camera.

The image processing unit of the disclosure can be configured to create a depth map from the original images of the image recording units. For this purpose, a depth sensor can expediently be present.

According to further aspect of the disclosure, a method for generating a displayed image that can be imaged by an image display unit is provided. The method according to an aspect of the disclosure is based on the assumption that a displayed image is generated from at least two original images recorded by at least two image recording units. In this case, at least two original images of an object which differ at least with regard to one item of image information are recorded from different perspectives. According to an aspect of the disclosure, at least one of the two original images is supplemented by items of image information from the other original image when generating the displayed image.

The at least two original images can be recorded with a different depth of field, object resolution and/or focal plane. When generating a displayed image, at least one of the two original images is supplemented by the item of image information of depth of field and/or resolution from the other original image.

If the at least two original images differ with regard to the object resolution, then the object resolution of a displayed image generated from an original image of lower resolution is increased for objects in or near the focal plane. However, it is also possible for the corresponding object resolution to be equated to the object resolution of the original image of higher resolution.

If the at least two original images differ with regard to the depth of field, then the object resolution of a displayed image generated from an original image of lower depth of field is increased for objects outside the depth of field range. However, it is also possible for the object resolution of a displayed image generated from an original image of lower depth of field, for objects outside the depth of field range, to be equated to the object resolution of the original image of higher depth of field. Expediently, the object resolution for all objects within the depth of field range of the original image of higher depth of field is at least approximately equated in both displayed images.

In one advantageous variant of the disclosure, a matching of at least one further item of image information for the displayed images can be carried out, wherein the matching can expediently be carried out with at least one of the items of image information of brightness, contrast or color information.

In a first exemplary embodiment, the method for generating a displayed image is distinguished by the fact that a first intermediate image is generated from a first original image using texture information of a second original image with a disparity transformation, and that the first displayed image is generated regionally from those regions of the first original image or of the first intermediate image which have the higher image sharpness in each case and/or the higher contrast in each case.

In a further step, a second intermediate image is generated from the second original image using texture information of the first original image with a disparity transformation, and the second displayed image is generated regionally from those regions of the second original image or of the second intermediate image which have the higher image sharpness in each case and/or the higher contrast in each case.

A further exemplary embodiment of the method according to the disclosure is distinguished by the fact that a depth map is generated from the first and second original image and that a first and a second displayed image with the respective stereo perspective of the original image are generated on the basis of the depth map, wherein that original image in which the object resolution in the respective depth plane is higher is used regionally. A depth sensor and/or methods for structured illumination can additionally be used for generating the depth map.

In the exemplary embodiments described, when generating a displayed image, the transitions of regions in an image can be smoothed or interpolated. Furthermore, it is possible for shadings in an original image to be supplemented with textures from the respective other stereo perspective.

Consequently, a first and a second displayed image for the left and right eye, respectively, are made available to the observer, which images can be viewed effortlessly by the observer. With the proposed method, there is no longer any disparity between the structures in the images made available to the left and right eyes. Consequently, a matching of the images for the left and right eye, respectively, with regard to differences in resolution and depth of field no longer has to be carried out by the observer himself/herself in the brain under conditions made more difficult. The displayed images for the left and right eye, respectively, that are offered to the observer satisfy all prerequisites for stereo vision that is pleasant for the observer. Observers having different visual acuities, in particular, perceive the images offered according to the provided method as particularly pleasant since these observers often have problems in actually being able at all to fuse displayed images generated in accordance with the related art.

BRIEF DESCRIPTION OF THE DRAWINGS

The disclosure will now be described with reference to the drawings wherein.

DESCRIPTION OF EXEMPLARY EMBODIMENTS

Figure 1:
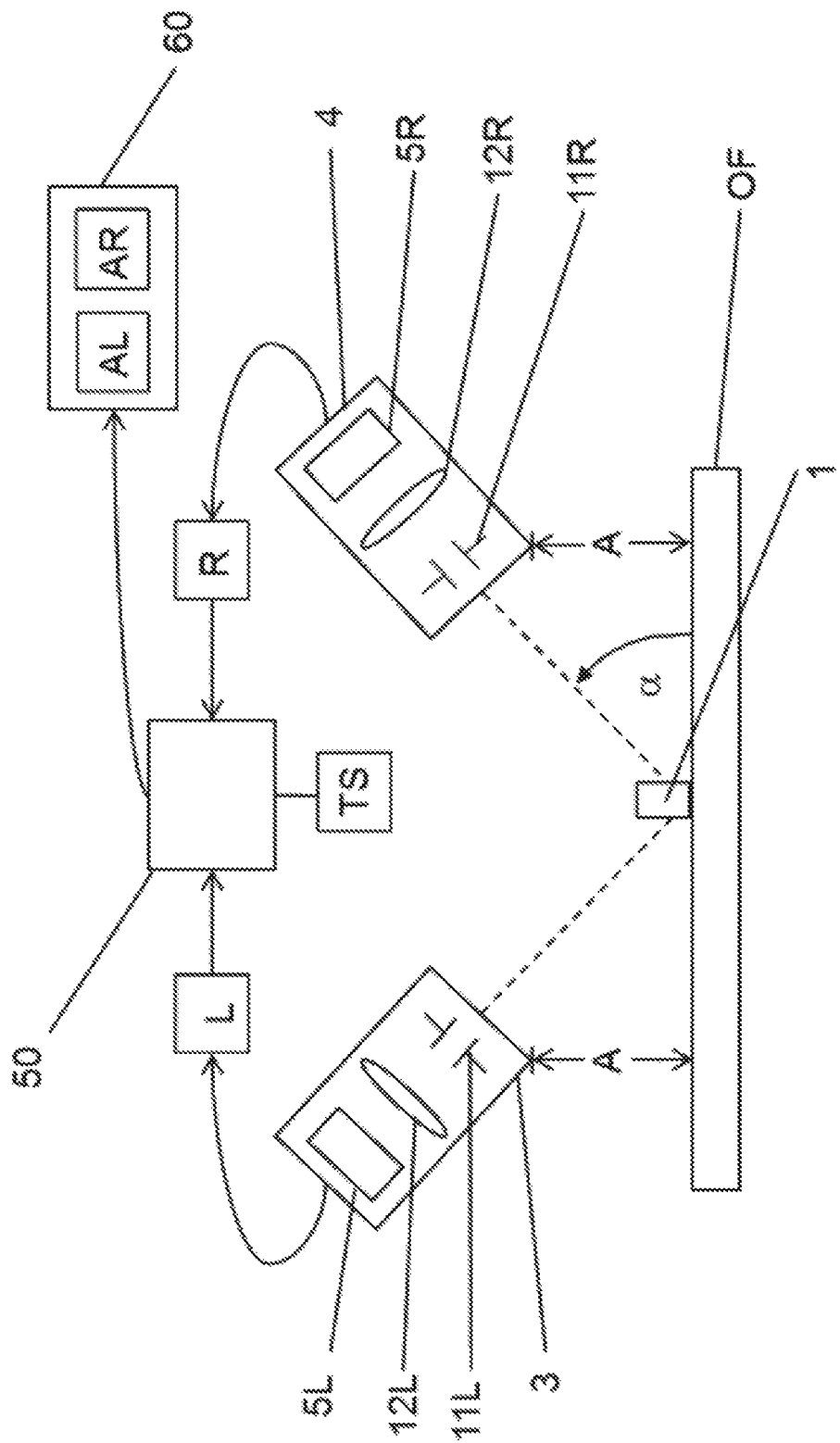
FIG. 1 shows a schematic illustration of the digital surgical microscope according to an exemplary embodiment of the disclosure.

FIG. 1 schematically illustrates a digital stereoscopic device, e.g., a stereoscopic surgical microscope according to an exemplary embodiment of the disclosure.

In this case, an object 1 to be displayed is situated on an operation site OF, for example.

The object 1 is recorded by two image recording units 3 and 4, e.g., cameras, a left image recording unit 3 for recording the left original image L and a right image recording unit 4 for recording the right original image R. In this case, the image recording units 3 and 4 are arranged at a specific angle α and at a distance A with respect to the object 1 and operation site OF, with the result that a stereoscopic recording is possible. By way of example, one image recording unit 3 can be a monochrome camera and the other image recording unit 4 can be a color camera. It goes without saying, however, that both image recording units 3 and 4 can also be monochrome cameras or color cameras.

For setting optical parameters, the left image recording unit 3 has a settable aperture stop 11L and a lens 12L, wherein an optical sensor 5L for image recording is provided. The right image recording unit 4 likewise includes a settable aperture stop 11R, a lens 12R and an optical sensor 5R. The left original image L of the left image recording unit 3 has a lower depth of field and a higher resolution of the object 1 in relation to the right original image R of the right image recording unit 4. The original image L of the left image recording unit 3 and that of the right image recording unit 4 are processed in a video image processing unit 50. Here the higher-resolution perspective in each case is assigned with an image processing algorithm, e.g., on the basis of a disparity transformation or a depth map, wherein displayed images AL and AR are subsequently generated, such that the same object resolution and depth of field are present for each channel of the stereo perspective.

FIG. 1 additionally shows a depth sensor TS. Said depth sensor TS is illustrated by way of example as an individual sensor. It goes without saying that it is also possible for the depth sensor TS to be integrated in one or both image recording units 3 and 4. The image sensor TS is connected to the image processing unit 50 and serves for calculating a depth map from the original images L and R recorded by the image recording units 3 and 4.

The displayed images AL and AR, generated by the image processing unit 50, of the original images L and R recorded by the left image recording unit 3 and the right image recording unit 4 are transmitted to an image display unit 60, e.g., a screen, which optically displays the left displayed image AL and the right displayed image AR for the observer. One advantage of the disclosure here is that the assignment of the higher-resolution perspective in each case for the observer in the brain is obviated and improved and undemanding stereoscopic vision is thus made possible.

Figure 2:
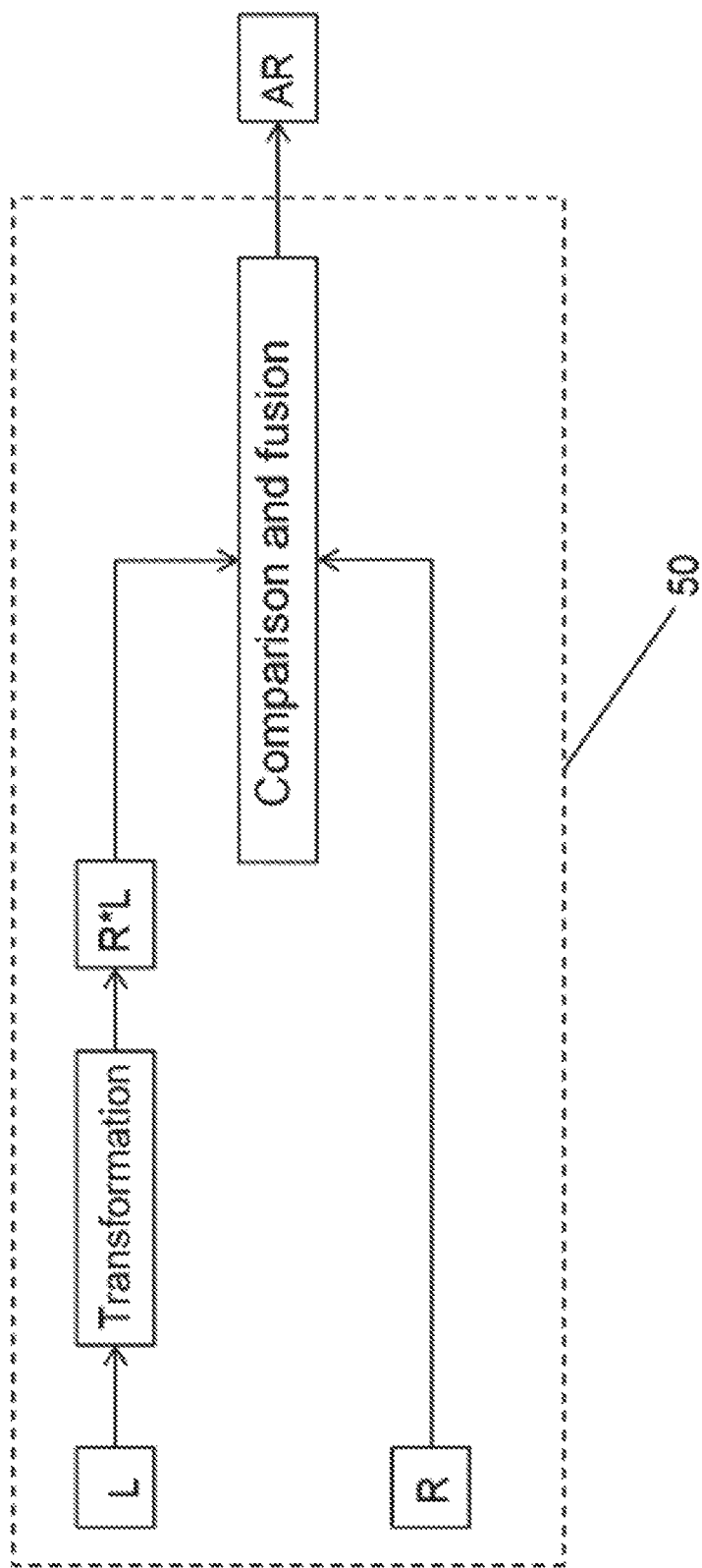
FIG. 2 shows a block diagram of an image processing algorithm with disparity transformation.

The image processing algorithm of a device according to an aspect of the disclosure with disparity transformation in accordance with FIG. 1 is illustrated in a block diagram in FIG. 2.

Firstly, the left original image L of the left image recording unit 3 and the right original image R of the right image recording unit 4 are present simultaneously in the video image processing unit 50. A disparity transformation of the left original image L into the right original image R is carried out first, thus giving rise to an intermediate image R*L having the right stereo perspective with the texture information of the left image L.

In a further step, for each image region of the intermediate image R*L the contrast and/or the image sharpness are/is compared with the corresponding image region of the right original image R. In this case, that image region of the intermediate image R*L or of the right original image R which has the higher image sharpness and/or the higher contrast is selected. The right displayed image AR is subsequently fused from these selected image regions. Consequently, the right displayed image AR generated has an increased resolution since the information of the left original image L having high resolution is superimposed with the right original image R having high depth of field. At transition regions, for example regions at which, owing to shadings, incomplete texture information is present or the image regions of the image recording units 3 and 4 do not overlap, suitable digital interpolation and smoothing are effected.

An analogous procedure is implemented (not illustrated) for the left displayed image AL, wherein the disparity transformation of the right original image R with the left original image L is carried out, followed by comparison of the intermediate image L*R with the left original image L and fusion.

Figure 3:
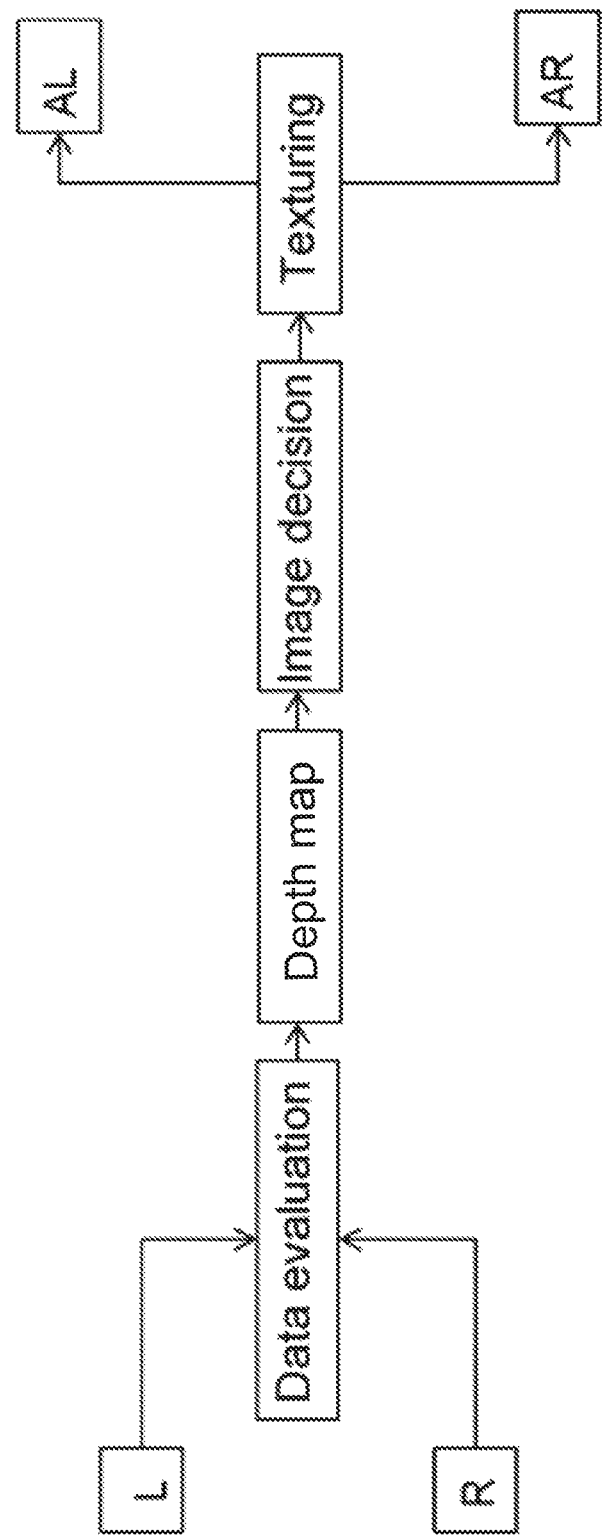
FIG. 3 shows a block diagram of the image processing algorithm with generated depth map.

FIG. 3 shows a block diagram of the image processing algorithm with depth map. In this case, the items of image information of the left original image L and of the right original image R are processed in a data evaluation in a first step. In a further step, a depth map is calculated according to a stereoscopic method from the related art. In coordination with the depth map, an image decision is taken for the right and left stereo perspective for each image region to the effect that original image L and R which has a higher object resolution in the assigned depth plane is determined. This information is then used to carry out a texturing of the left original image L and the right original image R, with the result that a left displayed image AL and a right displayed image AR are generated. Suitable digital smoothing and interpolation are effected at transitions. Shadings in a displayed image AL and AR can be filled in with textures of the original images R and L from the respective other stereo perspective. A displayed image AL and AR is thus generated for each stereo perspective.

In one exemplary embodiment of the disclosure, a depth map can also be generated from the original images R and L which were recorded with a color camera with a color sensor 5L and a monochrome camera with a black-and-white sensor 5R. When generating the displayed images AL and AR, in this case it is possible to use the color information of the color sensor 5L in addition to the structure information of the black-and-white sensor 5R.

In a further exemplary embodiment of the disclosure, the depth map can be generated with an additional depth sensor. Other known methods of structured illumination are also suitable for generating a depth map from the original images R and L of the image recording units.

Figure 4:
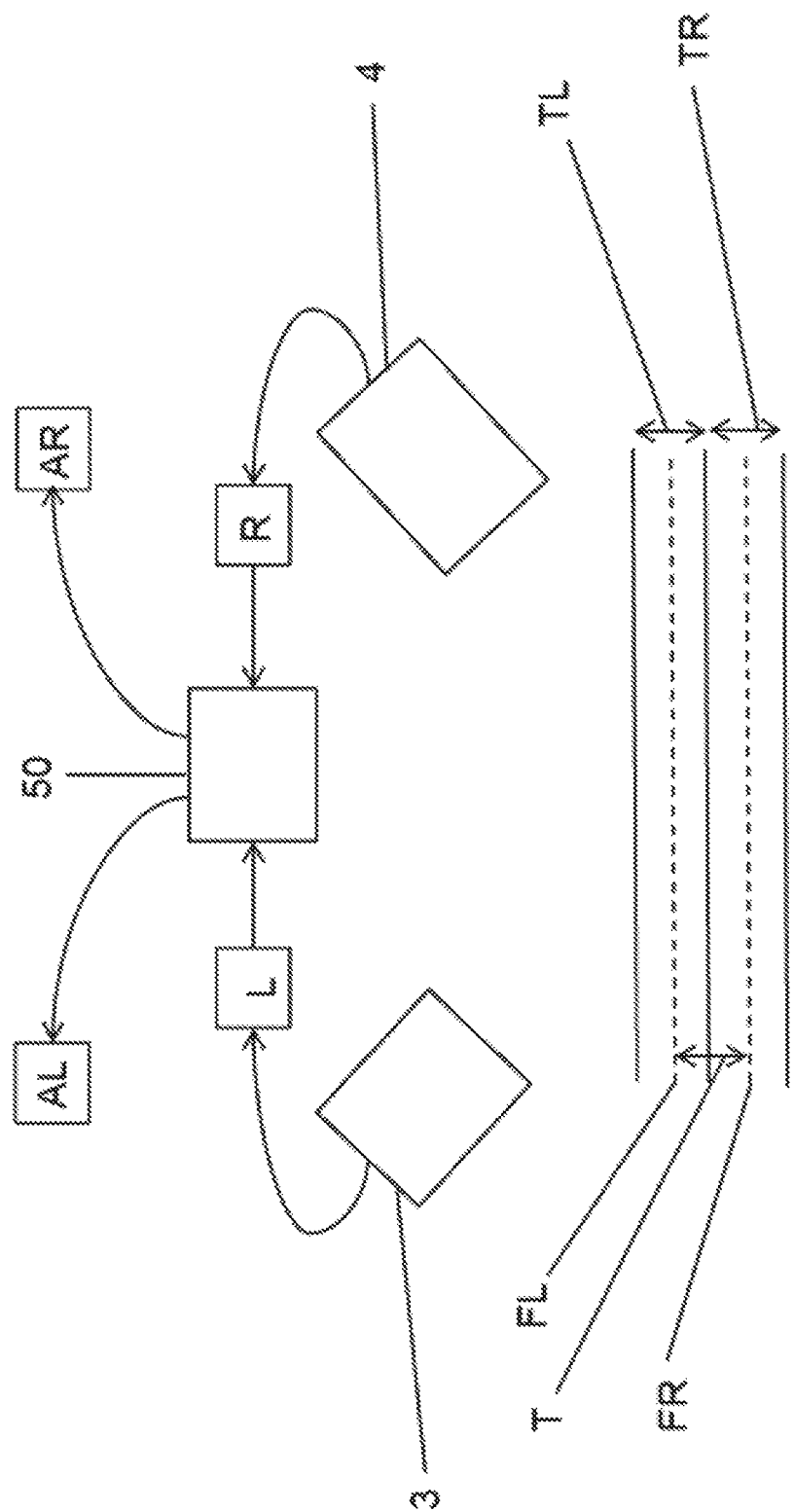
FIG. 4 shows a digital surgical microscope according to an exemplary embodiment of the disclosure.

In a further variant of the disclosure, a stereoscopic imaging device, e.g., a digital surgical microscope having a two-channel system, is illustrated schematically in FIG. 4. FIG. 4 shows a left image recording unit 3 and a right image recording unit 4 for recording original images L and R, which are processed to form displayed images AL and AR in an image processing unit 50.

The left image recording unit 3 has a left focal plane FL and the right image recording unit 4 has a right focal plane FR. Both focal planes FL and FR are spaced apart by a distance T. By way of example, the focal planes FL and FR are arranged parallel to one another.

The left image recording unit 3 and the right image recording unit 4 have similar sensor properties, wherein the depth of field TL of the left image recording unit 3, in relation to the depth of field TR of the right image recording unit 4, is of the order of magnitude of the distance T between the two focal planes FL and FR, and vice-versa. Consequently, the depth of field TL of the left image recording unit 3 is similar to the depth of field TR of the right image recording unit 4.

In other words, the distance between the focal planes FL and FR of the image recording units 3 and 4 is not more than the length of the full depth of field TL and TR.

The left original image L of the left image recording unit 3 and the right original image R of the right image recording unit 4 are passed to a video image processing unit 50. There the images are processed with the abovementioned image processing algorithms according to an aspect of the disclosure. With the combination of the given items of image information, an increased resolution and depth of field are present in the displayed image AL generated and in the displayed image AR generated. This is evident from the fact that in the displayed image AL and AR assigned to one image recording unit 3 and 4, the information of the depth of field of the respective other image recording unit 4 and 3 is superimposed.

As a result, a stereoscopic image with increased depth of field is displayed to the observer while maintaining the object resolution for each observation perspective. The device according to an exemplary embodiment of the disclosure is advantageous in particular since parallel recording with different focal positions has a low computational complexity in comparison with serial recording and displacement of the focal plane. It is conceivable to combine these two recording methods in order thus to generate an extended depth of field range.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Object
3 left image recording unit
4 right image recording unit
5L left image sensor
5R right image sensor
AL left displayed image
AR right displayed image
FR focal plane of right image recording unit
FL focal plane of left image recording unit
R right original image
L left original image
OF operational area
11L aperture stop
11R aperture stop
12L lens
12R lens
α angle
A distance
50 image processing unit
60 image display unit
FR focal plane of right image recording unit
FL focal plane of left image recording unit
TR depth of field of right image recording unit
TL depth of field of left image recording unit
T distance between the focal planes

What is claimed is:

1. A stereoscopic imaging device, comprising:
a first image recording unit configured to record a first original image of an object;
a second image recording unit configured to record a second original image of the object, wherein the first and second recording units are configured to record the first and second original images from different perspectives, wherein the first and second original images differ with regard to at least one item of image information, wherein the image information includes at least one optical property of the first and second original images, and wherein the at least one optical property comprises an object resolution;
an image display unit configured to image displayed images; and
an image processing unit configured to:
further process the first and second original images, and
supplement at least one of the first and second original images by adding the at least one item of the image information from the first original image to the second original image to generate a displayed image and transfer higher-resolution image data from a higher-resolution original image towards image data of a lower-resolution original image, wherein the object resolution of the displayed image generated from the lower-resolution original image, for objects in or near the focal plane, is equated to the object resolution of the higher-resolution original image.

2. The stereoscopic imaging device according to claim 1, wherein the first and second image recording units are arranged such that focal planes of the first and second image recording units are identical or such that the focal planes of the at first and second image recording units are inclined with respect to one another and intersect on or near an optical axis or the focal planes are spaced apart from one another maximally by a length of a full or half a depth of field.

3. The stereoscopic imaging device according to claim 1, wherein the first and second original images differ from one another with regard to items of the image information of a depth of field and/or a resolution.

4. The stereoscopic imaging device according to claim 3, wherein an object resolution of the displayed image generated from an original image of lower resolution for objects in or near a focal plane is increased compared with an original image of a lower resolution.

5. The stereoscopic imaging device according to claim 4, wherein the object resolution of the displayed image generated from the original image of lower resolution for objects in or near the focal plane corresponds to the object resolution of an original image of higher resolution.

6. The stereoscopic imaging device according to claim 3, wherein an object resolution of the displayed image generated from an original image of lower depth of field for objects outside a focal plane is increased compared with the original image of lower depth of field.

7. The stereoscopic imaging device according to claim 6, wherein the object resolution of the displayed image generated from the original image of lower depth of field for objects outside the focal plane corresponds to the object resolution of an original image of a higher depth of field.

8. The stereoscopic imaging device according to claim 3, wherein in at least two displayed images an object resolution for all objects within a depth of field range of an original image of higher depth of field is at least approximately the same.

9. The stereoscopic imaging device according to claim 3, wherein the image processing unit is configured to carry out matching of at least one further item of the image information for the displayed images.

10. The stereoscopic imaging device according to claim 9, wherein the at least one further item of the image information are brightness, contrast or items of color information.

11. The stereoscopic imaging device according to claim 1, wherein one the first and second image recording units is a color camera and another one of the first and second image recording units is a monochrome camera.

12. The stereoscopic imaging device according to claim 1, wherein the image processing unit is configured to create a depth map from the first and second original images.

13. The stereoscopic imaging device according to claim 12, further comprising:
a depth sensor configured to generate the depth map.

14. A method for generating at least one displayed image that can be imaged by an image display unit from at least two original images recorded by at least two image recording units, the method comprising:
recording the at least two original images of an object, which differ at least with regard to one item of image information, from different perspectives, wherein the image information includes at least one optical property of the at least two original images, and wherein the at least one optical property comprises an object resolution; and
supplementing at least one of the at least two original images by adding at least one item of the image information from one of the at least two original images to another of the at least two original images to generate the at least one displayed image; and
transferring higher-resolution image data from a higher-resolution original image towards image data of a lower-resolution original image, wherein the object resolution of the displayed image generated from the lower-resolution original image, for objects in or near the focal plane, is equated to the object resolution of the higher-resolution original image.

15. The method according to claim 14, further comprising:
recording the at least two original images with a depth of field, an object resolution and/or a focal plane that are different from one another; and
supplementing at least one of the at least two original images with an item of the image information of the depth of field and/or the object resolution from another one of the at least two original images.

16. The method according to claim 14, wherein an object resolution of a displayed image generated from an original image of lower resolution is increased for objects in or near a focal plane.

17. The method according to claim 14, wherein an object resolution of a displayed image generated from an original image of lower depth of field is increased for objects outside a depth of field range.

18. The method according to claim 17, wherein the object resolution of the displayed image generated from the original image of lower depth of field, for objects outside the depth of field range, is equated to the object resolution of an original image of higher depth of field.

19. The method according to claim 14, wherein an object resolution for all objects within a depth of field range of an original image of higher depth of field is at least approximately equated in both displayed images.

20. The method according to claim 14, further comprising:
carrying out a matching of at least one further item of the image information for displayed images.

21. The method according to claim 20, wherein the at least one further item of the image information is brightness, contrast or color information.

22. The method according to claim 14, further comprising:
generating a first intermediate image from a first original image using texture information of a second original image with a disparity transformation; and
generating a first displayed image regionally from those regions of the first original image or of the first intermediate image which each have a higher image sharpness and/or a higher contrast.

23. The method according to claim 22, further comprising:
generating a second intermediate image from the second original image using the texture information of the first original image with the disparity transformation, and
generating a second displayed image regionally from those regions of the second original image or of the second intermediate image which each have the higher image sharpness and/or the higher contrast.

24. The Method according to claim 22, further comprising:
   smoothening or interpolating transitions of regions when generating a displayed image.

25. The method according to claim 22, further comprising:
   supplementing shadings in an original image with textures from the respective other stereo perspective when generating a displayed image.

26. The method according to claim 14, further comprising:
   generating a depth map from a first original image and a second original image; and
   generating a first displayed image and a second displayed image with the respective stereo perspective of an original image based on the depth map,
   wherein that the original image in which the object resolution in the respective depth plane is higher is used regionally.

27. The method according to claim 26, further comprising:
   additionally utilizing a depth sensor and/or methods for structured illumination for generating the depth map.

* * * * *